United States Patent [19]

Kawakami et al.

[11] Patent Number: 4,464,505

[45] Date of Patent: Aug. 7, 1984

[54] COATING COMPOSITION FOR PROVIDING WATER AND BLISTER RESISTANT, INK-RECEPTIVE PAPER

[75] Inventors: Shigenao Kawakami, Nara; Terumasa Saka, Osaka; Shigeru Ura, Nara; Mikio Iwata, Osaka; Yoshiharu Tokugawa, Hyogo; Naoyoshi Jinno, Osaka, all of Japan

[73] Assignee: Sumitomo Chemical Company, Limited, Osaka, Japan

[21] Appl. No.: 449,333

[22] Filed: Dec. 13, 1982

[30] Foreign Application Priority Data

Apr. 16, 1982 [JP] Japan .................................. 57-64191
Apr. 16, 1982 [JP] Japan .................................. 57-64192

[51] Int. Cl.$^3$ ............................................. C08L 61/20
[52] U.S. Cl. .................................... 524/512; 106/213; 428/504; 428/513; 428/514; 428/530; 524/501; 524/503; 524/598; 524/843; 524/844

[58] Field of Search ................ 524/542, 598, 49, 612, 524/843, 844, 512, 501, 503; 525/510; 428/513, 530, 504, 514; 106/213

[56] References Cited

U.S. PATENT DOCUMENTS 2,601,597  6/1952  Daniel, Jr. et al. .............. 162/164.3
4,246,153  1/1981  Takagishi et al. ................... 524/843
4,287,110  9/1981  Takagishi et al. ................... 524/845

*Primary Examiner*—Theodore E. Pertilla
*Attorney, Agent, or Firm*—Sughrue, Mion, Zinn, Macpeak, and Seas

[57] ABSTRACT

A paper coating composition is described, containing a pigment and an aqueous binder as major components, and further containing a mixture of a reaction product between (a) at least one alkylenediamine or polyalkylenepolyamine and (b) epihalohydrin, and (Y) a water-soluble resin obtained by reacting urea, polyalkylenepolyamine, and dibasic carboxylic acid and reacting the resulting polyamidopolyurea with formaldehyde, or containing these reaction products.

20 Claims, No Drawings

COATING COMPOSITION FOR PROVIDING WATER AND BLISTER RESISTANT, INK-RECEPTIVE PAPER

BACKGROUND OF THE INVENTION

The present invention relates to a paper coating composition which provides coated paper having excellent water resistance, ink receptivity and excellent blister resistance, the coated paper being free from coloring and releasing only an extremely slight quantity of formaldehyde, and to a process for producing a novel thermosetting resin aqueous solution to be used as one component of the paper coating composition.

It has heretofore been known to produce coated paper having excellent printability by coating on paper a paper coating composition containing a pigment and an aqueous binder as major components and further containing auxiliary agents such as water resistance-imparting agents.

Recent years have seen remarkable progress in coated paper-producing techniques. For example, solids concentration of a coating composition is proposed to realize high-speed coating using a blade coater for the purpose of increasing productivity. Thus, it has been required to increase the solids concentration without an increase in viscosity for obtaining good coating properties.

In addition, with up-grading and speedup of printing and with rotary offset printing, a coated layer is required to possess higher water resistance, higher ink receptivity, and higher blister resistance.

In order to improve these properties, many proposals have been made, such as improvement of an aqueous binder component and improvement of auxiliary agents. For example, in order to improve water resistance, a water resistance-imparting agent is ordinarily compounded as an auxiliary agent because, though water resistance may be improved to some extent by increasing the weight ratio of aqueous binder to pigment, it in turn reduces ink receptivity upon printing coated paper.

Typical examples of the water resistance-imparting agents are those for aqueous binders. However, though conventionally used or proposed water resistance-imparting agents have some merits, they simultaneously possess serious defects, thus being practically unsatisfactory. For example, some problems with a melamine-formaldehyde precondensate are that it gives insufficient ink receptivity, that when the pH of the coating composition containing the precondensate is high, it shows insufficient water resistance, and that free formaldehyde is released from a coated paper in a significant amount. A reaction product between polyamidopolyurea and formaldehyde has not yet been provided having sufficient water-resisting effect and ink receptivity-improving effect, though such product shows some ink receptivity-improving effect, some water resistance, and releases free formaldehyde only in a slight amount from a coated paper.

Dialdehydes such as glyoxal are not preferable, because they color coated paper and show poor ink receptivity-improving effect. Multivalent metal salts such as zirconium salts are not preferable, either, because they seriously thicken the coating composition.

SUMMARY OF THE INVENTION

As a result of intensive investigations to overcome the above-described defects, it has now been found that a paper coating composition containing a specific thermosetting resin as a water resistance-imparting agent shows extremely excellent effects; thus the present invention has been achieved.

That is, the present invention is a paper coating composition which contains a pigment and an aqueous binder as major components, and further contains a mixture of (X) a reaction product between (a) at least one alkylenediamine or polyalkylenepolyamine and (b) epihalohydrin, and (Y) a water-soluble resin obtained by reacting urea, polyalkylenepolyamine, and dibasic carboxylic acid to form a polyamidopolyurea and reacting the resulting polyamidopolyurea with formaldehyde, or contains these reaction products; and a process for producing a thermosetting resin aqueous solution which comprises reacting (X) and (Y).

DETAILED DESCRIPTION OF THE INVENTION

Alkylenediamines that can be used in the present invention include ethylenediamine, trimethylenediamine, 1,2-propylenediamine, tetramethylenediamine, hexamethylenediamine, etc. These alkylenediamines may be used alone or in combinations of two or more.

The polyalkylenepolyamine to be used in the present invention is preferably a polyalkylenepolyamine having two primary amino groups and at least one secondary amino group per molecule and includes, for example, diethylenetriamine, triethylenetetramine, tetraethylenepentamine, iminobispropylamine, 3-azahexane-1,6-diamine, 4,7-diazadecane-1,10-diamine, etc. These polyalkylenepolyamines may be used alone or in combination of two or more.

Examples of epihalohydrins that can be used in the present invention include epichlorohydrin and epibromohydrin, with epichlorohydrin being particularly preferable.

Examples of dibasic carboxylic acids that can be used in the present invention include aliphatic carboxylic acids such as succinic acid, glutaric acid, adipic acid, sebacic acid, maleic acid, fumaric acid, etc.; aromatic carboxylic acids such as isophthalic acid, terephthalic acid, etc.; and mixtures thereof.

In the present invention, the reaction between (a) one, two or more alkylenediamines or polyalkylenepolyamines and (b) epichlorohydrin is usually carried out at from 30° to 80° C. for from 30 minutes to 10 hours. The molar ratio of amine to epihalohydrin is suitably 1:0.1 to 20, and preferably 1:2 to 10. The reaction product thus obtained is hereinafter referred to as (X).

The polyamidopolyurea to be used in the present invention includes a polyamidopolyurea obtained by a deammoniation reaction between urea and polyalkylenepolyamine, a dehydration condensation between the resulting product and dibasic carboxylic acid, and a deammoniation reaction between the resulting product and urea (hereinafter referred to as polyamidopolyurea (I)); a polyamidopolyurea obtained by a dehydration condensation between polyalkylenepolyamine and dibasic carboxylic acid, then a deammoniation reaction between the resulting product and urea (hereinafter referred to as polyamidopolyurea (II)); and the like.

In obtaining polyamidopolyurea (I), the molar ratio of urea to polyalkylenepolyamine is 1:1.5 to 2.5, and preferably about 1:2. The reaction temperature is suitably from 100° to 200° C., and preferably from 120° to 170° C. This reaction is conducted for from 2 to 8 hours while removing ammonia produced from the reaction system. Then, the reaction product is subjected to a dehydration condensation with 0.3 to 0.7 mol, per mol of polyalkylenepolyamine used, of a dibasic carboxylic acid. This reaction is conducted at a reaction temperature of from 120° to 250° C., and preferably from 140° to 200° C., for from 2 to 10 hours while removing water produced from the reaction system. The thus obtained condensation reaction product is further reacted with urea. The amount of urea reacted is from 0.2 to 1.5 moles, and preferably from 0.5 to 1.1 moles, per mole of secondary amino group in the starting polyalkylenepolyamine. The reaction temperature is from 100° to 180° C., and preferably from 120° to 150° C., and the reaction is carried out for from 1 to 5 hours while removing ammonia produced from the reaction system. Thus, polyamidopolyurea (I) is obtained.

In obtaining the polyamidopolyurea (II), the reaction between polyalkylenepolyamine and dibasic carboxylic acid is carried out at a temperature of from 120° to 250° C., and preferably from 140° to 200° C., for from 2 to 10 hours while removing water produced from the reaction system. From 1.4 to 3.0 moles, and preferably from 1.8 to 2.5 moles, of the polyalkylenepolyamine is used per mole of the dibasic carboxylic acid. The thus obtained dehydration condensation reaction product is then reacted with urea. The urea is used in an amount of from 0.2 to 1.0 mole, and preferably from 0.4 to 0.8 mole, per mole of amino group in the starting polyalkylenepolyamine. The reaction temperature is from 100° to 180° C., and preferably from 120° to 150° C. The reaction is carried out for from 1 to 5 hours while removing ammonia produced from the reaction system. As to the manner of charging the urea, the desired amount of urea may be charged at one time to react, or a part of the desired amount of urea may first be charged, and, after completion of the deammoniation reaction, the remaining amount of urea may be charged, followed by again conducting deammoniation reaction. Thus, polyaminopolyurea (II) is obtained.

The thus obtained polyamidopolyurea is dissolved in water to react it with formaldehyde. This reaction is conducted in an aqueous solution containing from 20 to 70 wt%, and preferably 30 to 60 wt%, of the polyamidopolyurea and having a pH adjusted to 7 or less, preferably 3.5 to 6.5, with an acid such as hydrochloric acid, sulfuric acid, phosphoric acid, formic acid or acetic acid, at a reaction temperature of 40° to 80° C. for 1 to 10 hours. This reaction is preferably conducted under acidic conditions as described above. However, the end product of the present invention can also be obtained by initially conducting the reaction under alkaline conditions of, for example, pH 8 to 12, adjusting the pH to 7 or less, and preferably 3.5 to 6.5, and continuing the reaction. In this case, the reaction under alkaline conditions is conducted at from 40° to 80° C. for from 0.5 to 3 hours, and the subsequent reaction under acidic conditions is carried out at from 40° to 80° C. for from 1 to 10 hours. The amount of formaldehyde is suitably from 0.2 to 1 mole, and preferably from 0.3 to 0.7 mole, per mole of the total urea used for synthesizing the polyamidopolyurea.

After completion of the reaction or mixing, the pH of the resulting reaction product or mixture may, if desired, be adjusted to from 6 to 9. The water-soluble resin thus obtained is hereinafter referred to as (Y).

The thus obtained water-soluble resin (Y) is further mixed or reacted with the reaction product (X) for use.

In mixing (X) with (Y), (X) and (Y) may separately be mixed with a paper coating composition, or a previously prepared mixture of (X) and (Y) may be added to a paper coating composition. The amount of (X) to be used is from 0.05 to 5 moles, and preferably from 0.1 to 2 moles, of (a) in (X) per mole of the dibasic carboxylic acid used for synthesizing (Y).

In reacting (X) with (Y), this reaction is carried out at from 20° to 80° C. for from 30 minutes to 10 hours. After completion of the reaction, the pH of the product may, if desired, be adjusted to 2 to 6.

The paper coating composition of the present invention is prepared in a conventional manner, but, for fully attaining the effect, an aqueous binder is compounded in a solid amount of from 3 to 30 wt%, and preferably from 5 to 20% wt%, based on the weight of pigment, and a reaction product or mixture of (a), (b), and (Y) is compounded in a solid amount of from 0.05 to 5 wt%, and preferably from 0.1 to 2 wt%, based on the weight of pigment.

As the water resistance-imparting agent, that specified according to the present invention exerts fully sufficient effects, but in some cases, it may be partially substituted by other water resistance-imparting agents.

As the aqueous binder and the pigment to be used in preparing the paper coating composition of the present invention, those conventionally known may be used. The aqueous binder is exemplified by water-soluble binders such as starch, oxidized starch, modified starch, polyvinyl alcohol, casein, gelatin, carboxymethyl cellulose, hydroxyethyl cellulose, soybean protein, etc.; and water emulsion or dispersion system binders such as styrene-butadiene type resin, vinyl acetate resin, ethylene-vinyl acetate resin, methyl methacrylate resin, etc.

The pigment includes, for example, inorganic pigments such as kaolin clay, talc, titanium dioxide, aluminum hydroxide, calcium carbonate, satin white, barium sulfate, etc.; and organic pigments containing styrene, urea, etc., as major components. These may be used alone or in combinations of two or more in any desired mixing ratio.

The paper coating composition of the present invention may contain, if desired, other ingredients such as a dispersing agent, a thickening agent, a thinning agent, a defoaming agent, a foam inhibitor, an antiseptic, an antifungal agent, a fluidity-adjusting agent, a repellent, a colorant (e.g., a dye, colored pigment, etc.), an agent for imparting special properties (e.g., an electroconductive agent), etc.

The coating composition of the present invention can be prepared in a manner analogous to conventional coating compositions. Usually, the solids concentration of the coating composition is adjusted to from 30 to 80 wt%, and preferably from 50 to 65 wt%.

The paper coating composition of the present invention is coated on a paper substrate in a conventionally known manner using a blade coater, air-knife coater, roll coater, size-press coater, cast coater, or the like, subjected to necessary drying in an ordinary manner, and, if desired, subjected to super calendering, machine calendering, or the like to produce coated paper.

The paper coating composition of the present invention obtained as described above has numerous merits; it suffers no color shocks (a serious increase in viscosity of the composition, aggregation of pigment, etc.), shows excellent stability, and, when coated on a paper substrate, it forms thereon an excellent water-resisting coating layer, releases only a remarkably decreased amount of formaldehyde, shows improved ink receptivity, undergoes no coloration, and imparts improved blister resistance in rotary offset printing.

The present invention will now be described in more detail by referring to examples and comparative examples, in which percentages are by weight unless otherwise specified.

EXAMPLE 1

(i) Synthesis of Compound (X-1):

44 g (0.3 mole) of triethylenetetramine and 189 g of water were charged in a four-neck flask equipped with a thermometer, a reflux condenser, and a stirring rod, and 167 g (1.8 moles) of epichlorohydrin was added thereto while keeping the temperature at 40° C. The reaction was continued at 40° C. for 2 hours, followed by cooling to obtain a 50% aqueous solution of a compound (X-1).

(ii) Synthesis of Compound (X-2):

60 g (1 mole) of ethylenediamine and 270 g of water were charged in the same apparatus as used in (i), and 185 g (2 moles) of epichlorohydrin was added thereto while keeping the inside temperature at 50° C. The reaction was continued for 1 hour at 50° C., then the reaction mixture was cooled to obtain a 50% aqueous solution of a compound (X-2).

(iii) Synthesis of Resin (Y-1):

292 g (2 moles) of triethylenetetramine and 60 g (1 mole) of urea were charged in a four-neck flask equipped with a thermometer, a reflux condenser, and a stirring rod, and a deammoniation reaction was conducted at 150° to 153° C. for 3 hours. Then, 146 g (1 mole) of adipic acid was added thereto, and a dehydration condensation was conducted at 155° to 160° C. for 5 hours. After cooling the reaction mixture to 130° C., 240 g (4 moles) of urea was added thereto, and a deammoniation reaction was conducted at 130° to 135° C. for 2 hours, followed by gradual addition of 550 g of water to obtain a polyamidopolyurea aqueous solution.

Then, 121.5 g (1.5 moles) of 37% formalin was added thereto, and the resulting mixture was adjusted to 4 in pH with 20N sulfuric acid, kept at 70° C. for 4 hours while stirring, cooled to 30° C., and adjusted to pH=6.5 with a 10N sodium hydroxide aqueous solution to obtain a resin (Y-1) containing 50% solids.

(iv) Preparation of Resin (1):

The whole amount of compound (X-1) obtained in (i) and the whole amount of resin (Y-1) obtained in (iii) were charged in the same apparatus as in (iii), and the pH of the resulting mixture was adjustee to 4 with 20N sulfuric acid while stirring to obtain an aqueous solution of a thermosetting resin (1) containing 50% solids.

(v) Synthesis of Resin (2):

As in (iv), the whole amount of compound (X-1) obtained in (i) and the whole amount of (Y-1) obtained in (iii) were charged and reacted with each other at 35° to 40° C. for 2 hours, and the pH of the reaction mixture was adjusted to 4 with 20N sulfuric acid to obtain an aqueous solution of a thermosetting resin (2) containing 50% solids.

(vi) Synthesis of Resin (3):

41 g (0.4 mole) of diethylenetriamine and 240 g of waer were charged in the same apparatus as in (iii), and 185 g (2 moles) of epichlorohydrin was added thereto while keeping the temperature at about 45° C. After continuing the reaction at 45° C. for 1 hour, the resin (Y-1) obtained in (i) was added thereto in the same amount as in (i), and the reaction was conducted at 40° to 45° C. for 2 hours. Then, pH of the reaction solution was adjusted to 3.5 with 20N sulfuric acid to obtain an aqueous solution of a thermosetting resin (3) containing 50% solids.

(vii) Synthesis of Resin (Y-2):

365 g (2.5 moles) of triethylenetetramine, 20 g of water, and 146 g (1 mole) of adipic acid were charged in the same apparatus as in (iii), and dehydration condensation was conducted at 155° to 160° C. for 4 hours. Then, 60 g (1 mole) of urea was added thereto, and a deammoniation reaction was conducted at 145° to 150° C. for 3 hours. After cooling the reaction mixture to 130° C., 240 g (4 moles) of urea was further added thereto, and a deammoniation reaction was conducted at 130° to 140° C. for 3 hours, followed by gradual addition of 595 g of water to obtain an aqueous solution of polyamidopolyurea. Then, 162 g (2 moles) of a 37% formalin was added thereto, and the resulting mixture was adjusted to pH=4.5 with 20N sulfuric acid, and kept at 60° C. for 4 hours while stirring. After cooling the reaction solution to 25° C., its pH was adjusted to 7.5 with a 10N sodium hydroxide aqueous solution to obtain a resin (Y-2) containing 50% solids.

(viii) Synthesis of Resin (4):

The whole amount of compound (X-2) obtained in (ii) and the whole amount of resin (Y-2) obtained in (vii) were charged in the same apparatus as in (iii), and the pH of the mixture was adjusted to 3 with 20N sulfuric acid while stirring to obtain an aqueous solution of a thermosetting resin (4) containing 50% solids.

(ix) Synthesis of Resin (5):

The whole amount of compound (X-2) obtained in (ii) and the whole amount of resin (Y-2) obtained in (vii) were charged in the same apparatus as in (iii) and reacted with each other at 45° to 50° C. for 2 hours. Then, the pH of the reaction solution was adjusted to 3 with 20N sulfuric acid to obtain an aqueous solution of a thermosetting resin (5) containing 50% solids.

(x) Synthesis of Resin (6):

38 g (0.2 mole) of tetraethylenepentamine and 200 g of water were charged in the same apparatus as in (iii), and 130 g (1.4 moles) of epichlorohydrin was added thereto while keeping the temperature at about 40° C. The reaction was continued at 40° C. for 3 hours.

Then, the whole amount of resin (Y-2) obtained in (vii) was added thereto, and the reaction was conducted at 35° to 40° C. for 2 hours.

After completion of the reaction, the pH of the reaction mixture was adjusted to 4 with 20N sulfuroc acid to obtain an aqueous solution of a thermosetting resin (6) containing 50% solids.

(xi) Synthesis of Resin (Y-3):

206 g (2 moles) of diethylenetriamine and 60 g (1 mole) of urea were charged in the same reaction apparatus as in (iii), and a deammoniation reaction was conducted at 145° to 150° C. for 3 hours. Then, 118 g (1 mole) of succinic acid was added thereto, and a dehydration condensation was conducted at 150° C. for 4 hours. After cooling the reaction mixture to 130° C., 96 g (1.6 moles) of urea was added thereto, and a deammoniation reaction was conducted at 125° to 130° C. for 3 hours, followed by adding thereto 355 g of water to obtain a polyamidopolyurea aqueous solution.

Then, 105.3 g (1.3 moles) of 37% formalin was added thereto, and the pH of the reaction mixture was adjusted to 10 with 10N sodium hydroxide. After keeping the mixture at 60° C. for 2 hours while stirring, its pH was adjusted to 5.5 with concentrated hydrochloric acid, after which it was kept at 60° C. for 3 hours while stirring. Thereafter, the mixture was cooled to 25° C., and its pH was adjusted to 7.5 with a 10N sodium hydroxide aqueous solution to obtain a resin (Y-3) containing 50% solids.

(xii) Synthesis of Resin (7):

29 g (0.2 mole) of triethylenetetramine and 130 g of water were charged in the same reaction apparatus as in (iii), and 111 g (1.2 moles) of epichlorohydrin was added thereto while keeping the temperature at 40° C. After continuing the reaction at 40° C. for 2 hours, the whole amount of water-soluble resin (Y-3) described above was added thereto, and reaction was conducted at 35° to 40° C. for 2 hours.

Then, the pH of the reaction mixture was adjusted to 5 with 20N sulfuric acid to obtain an aqueous solution of a thermosetting resin (7) containing 50% solids.

(xiii) Synthesis of Resin (8):

29 g (0.2 mole) of tetraethylenepentamine, 21 g (0.2 mole) of diethylenetriamine, and 240 g of water were charged in the same reaction apparatus as in (iii), and 185 g (2.0 moles) of epichlorohydrin was added thereto while keeping the temperature at 40° C. After continuing the reaction at 40° C. for 2 hours, the whole amount of resin (Y-1) obtained in (iii) was added thereto, and reaction was conducted at 40° to 45° C. for 2 hours.

Then, the pH of the reaction mixture was adjusted to 4 with 20N sulfuric acid to obtain an aqueous solution of a thermosetting resin (8) containing 50% solids.

(xiv) Synthesis of Resin (Y-4):

103 g (1 mole) of diethylenetriamine, 146 g (1 mole) of triethylenetetramine, 20 g of water, and 100 g of a dibasic carboxylic acid mixture (0.77 mole as dibasic carboxylic acid) (composed of 22% succinic acid, 64% glutaric acid, and 14% adipic acid) were charged in the same reaction apparatus as in (iii), and dehydration condensation was conducted at 160° to 165° C. for 4 hours. Then, 60 g (1 mole) of urea was added thereto, and a deammoniation reaction was conducted at 145° to 150° C. for 4 hours. After cooling the reaction mixture to 130° C., 180 g (3 moles) of urea was further added thereto, and a deammoniation reaction was conducted at 130° to 140° C. for 5 hours. Then, 410 g of water was gradually added thereto to obtain a polyamidopolyurea aqueous solution.

To this solution was added 97.2 g (1.2 moles) of a 37% formalin, and the resulting mixture was adjusted to pH=4 with concentrated hydrochloric acid and kept at 50° C. for 6 hours while stirring. After cooling the reaction solution to 30° C., its pH was adjusted to 6.5 with a 10N sodium hydroxide aqueous solution to obtain a resin (Y-4) containing 50% solids.

(xv) Synthesis of Resin (9):

34 g (0.23 mole) of triethylenetetramine and 190 g of water were charged in the same reaction apparatus as in (iii), and 128 g (1.38 moles) of epichlorohydrin was added thereto while keeping the inside temperature at about 50° C. After continuing the reaction at 50° C. for 1 hour, the whole amount of watersoluble resin (Y-4) described above was added thereto, and reaction was conducted at 45° to 50° C. for 1 hour.

Then, pH of the reaction mixture was adjusted to 5 with 20N sulfuric acid to obtain an aqueous solution of a thermosetting resin (9) containing 50% solids.

EXAMPLES 2 TO 14

(1) Preparation of Paper Coating Compositions:

Kaolin clay, calcium carbonate, and aluminum hydroxide were used as pigments. To a pigment slurry dispersed in water by adding a sodium polyacrylate type dispersing agent were added an aqueous solution of previously gelatinized oxidized starch and a styrene-butadiene latex. Further, water resistance-imparting agents were added in amounts as indicated in Table 1, and the resulting mixtures were stirred well to properly mix the ingredients. The pH of the compositions was finally adjusted to 9.5 with a sodium hydroxide aqueous solution, and the solids concentration thereof was adjusted to 55 wt% to prepare paper coating compositions. Additionally, the basic compounding ratios of ingredients other than the water resistance-imparting agents in the compositions are shown in Table 1.

(2) Preparation of Coated Paper:

Each of the compositions obtained as described above was coated on both sides of a base paper of 85 g/m$^2$ in basis weight in an amount of about 15 g/m$^2$ per one side of the paper using a coating rod, then dried in hot air at 120° C. for 30 minutes. Then, the resulting coated papers were subjected to super calendering (roll temperature: 60° C.; roll linear pressure: 60 kg/cm; passing time: twice), and conditioned at 20° C. and 65% RH to be used as test samples for various tests.

(3) Various Testing Methods:

(A) Physical properties of coating solution:

(i) pH of coating solution—measured at 20° C. on a glass electrode pH meter (ii) Viscosity of coating solution—measured at 20° C. and 60 rpm on a Brookfield viscometer (B) Physical properties of coated paper:

(i) Water resistance of coated film:

(a) Wet Rub method:

About 0.1 ml of deionized water was dropped onto a coated paper, and rubbed seven times with the tip of a finger. The eluate was transferred to a black paper to judge the amount of the eluate with the naked eye.

The judgement was conducted by assigning a value ranging from 1 (poor water resistance) to 5 (excellent water resistance).

(b) Wet Pick method:

The coated surface was wetted by a water supply roll using an RI tester (made by Akira Seisakusho) and subjected to printing to observe and judge the state of delamination and damage of coated layer with the naked eye according to the same judging rating as in Wet Rub method.

(ii) Determination of formaldehyde released from coated paper—according to the acetylacetone method described in JIS L-1041, liquid phase extraction method (2).

Additionally determination of formaldehyde was conducted, for example, by sealing the sample in a polyethylene bag for protecting it from formaldehyde released from other samples or for preventing exhalation of formaldehyde from the sample.

(iii) Ink receptivity of coated paper:

Samples were printed according to either of the following methods using an RI tester, and ink receptivity was observed and judged with the naked eye. The judgement was conducted by assigning a value ranging from 5 (good) to 1 (poor).

(a) Method A

Water was dropwise added to an ink under milling, then the resulting ink was used for printing.

(b) Method B

The coated surface of a sample was wetted with a water supply roll, then printed.

(c) Method C

Printing was conducted by combining the above-described Methods A and B.

(iv) Whiteness and heat-resistant whiteness:

Whiteness of a coated paper sample before and after heat treatment at 150° C. for 30 minutes using a hot-air drying machine was measured according to JIS P-8123 by measuring the B value on a Hunter reflectometer. The higher the value, the better the whiteness.

(v) Blister resistance:

A double-coated paper sample was printed on both sides with an ink for rotary offset printing using an RI tester and, after conditioning, it was dipped in a heated silicone oil bath to determine the minimum temperature at which blistering took place.

(4) Results of Tests:

Resins obtained in Example 1 were used to evaluate them according to the manners described above. Resins used and compounding formulations are shown in Table 2.

Results of the tests on their properties are also shown in Table 2.

COMPARATIVE EXAMPLES 1 AND 2

A coating composition was prepared in the same manner as in the Examples above except for not using obtained in Example 1, polyalkylenepolyamine, alkylenediamine and epihalohydrin as water resistance-imparting agents to evaluate their properties. Compounding formulations and results of tests on properties are shown in Table 3.

COMPARATIVE EXAMPLES 3 TO 6

A coating composition was prepared in the same manner as in Examples except for using resin (Y-1) or (Y-2) alone as a water resistance-imparting agent for evaluating its properties. Compounding formulations and results of the tests on properties are shown in Table 3.

TABLE 1

| Compound Ingredient | Formulation No. 1 | Formulation No. 2 |
|---|---|---|
| Kaolin clay | 85 parts by weight | 80 parts by weight |
| Calcium carbonate | 15 parts by weight | 0 parts by weight |
| Aluminum hydroxide | 0 parts by weight | 20 parts by weight |
| Dispersing agent (sodium polyacrylate) | 0.4 parts by weight | 0.4 parts by weight |
| Styrene-butadiene type latex | 10 parts by weight | 10 parts by weight |
| Oxidized starch | 6 parts by weight | 6 parts by weight |

TABLE 2 (A)

| Item | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|
| Compounding formulation | | | | | | | | | | | | | |
| Water resistance-imparting agent | Resin (1) | Resin (2) | Resin (4) | Resin (5) | Resin (1) | Resin (2) | Resin (4) | Resin (5) | Resin (3) | Resin (6) | Resin (7) | Resin (8) | Resin (9) |
| (part) | 0.5 | 0.5 | 0.5 | 0.5 | 0.5 | 0.5 | 0.5 | 0.5 | 0.5 | 0.5 | 0.5 | 0.5 | 0.5 |
| Formulation No. | 1 | 1 | 1 | 1 | 2 | 2 | 2 | 2 | 1 | 1 | 1 | 1 | 1 |
| Physical properties of coating composition | | | | | | | | | | | | | |
| Viscosity (cps) Upon prep. | 560 | 570 | 580 | 580 | 470 | 480 | 450 | 460 | 560 | 580 | 560 | 570 | 560 |
| After 24 hrs. | 570 | 580 | 610 | 600 | 500 | 520 | 490 | 490 | 580 | 590 | 580 | 590 | 590 |
| pH (upon prep.) | 9.4 | 9.3 | 9.4 | 9.4 | 9.4 | 9.4 | 9.4 | 9.3 | 9.4 | 9.4 | 9.5 | 9.5 | 9.5 |
| Properties of coated paper | | | | | | | | | | | | | |
| Coated amount/side (g/m$^2$) | 15.0 | 15.2 | 14.9 | 15.1 | 15.1 | 15.3 | 15.5 | 15.0 | 15.1 | 14.9 | 15.0 | 15.0 | 15.1 |
| Water resistance | | | | | | | | | | | | | |
| Wet Pick method | 4.8 | 4.9 | 4.8 | 4.8 | 4.9 | 4.8 | 4.8 | 4.8 | 4.8 | 4.8 | 4.7 | 4.8 | 4.8 |
| Wet Rub method | 4.7 | 4.8 | 4.7 | 4.7 | 4.8 | 4.9 | 4.8 | 4.8 | 4.8 | 4.8 | 4.8 | 4.8 | 4.8 |
| Properties of coated paper | | | | | | | | | | | | | |
| Amount of released formaldehyde (ppm) | 8 | 8 | 7 | 8 | 8 | 8 | 9 | 8 | 9 | 8 | 8 | 8 | 9 |
| Ink receptivity | | | | | | | | | | | | | |
| Method A | 4.8 | 4.8 | 4.7 | 4.7 | 4.8 | 4.8 | 4.7 | 4.7 | 4.8 | 4.7 | 4.8 | 4.8 | 4.8 |
| Method B | 4.8 | 4.9 | 4.7 | 4.8 | 4.8 | 4.7 | 4.7 | 4.8 | 4.8 | 4.7 | 4.8 | 4.8 | 4.8 |
| Method C | 4.7 | 4.8 | 4.7 | 4.7 | 4.8 | 4.8 | 4.7 | 4.8 | 4.8 | 4.9 | 4.7 | 4.7 | 4.8 |
| Whiteness (%) | | | | | | | | | | | | | |
| Before heat treatment | 79.8 | 79.7 | 79.5 | 80.0 | 80.0 | 80.2 | 79.9 | 79.9 | 80.1 | 80.0 | 79.8 | 80.1 | 80.0 |
| After heat treatment | 77.5 | 78.2 | 77.8 | 77.9 | 78.1 | 77.9 | 77.8 | 78.0 | 77.9 | 78.1 | 77.8 | 78.0 | 77.9 |
| Blister resistand (°C.) | 240 | 240 | 240 | 230 | 230 | 230 | 230 | 230 | 240 | 230 | 230 | 230 | 230 |

TABLE 3

| Item | Paper Coating Composition | | | | | |
|---|---|---|---|---|---|---|
| | Comp. Ex. 1 | Comp. Ex. 2 | Comp. Ex. 3 | Comp. Ex. 4 | Comp. Ex. 5 | Comp. Ex. 6 |
| Compounding formulation | | | | | | |
| Water resistance-imparting agent (part) | No | No | Resin (Y-1) 0.5 | Resin (Y-1) 0.5 | Resin (Y-2) 0.5 | Resin (Y-2) 0.5 |
| Formulation No. | 1 | 2 | 1 | 2 | 1 | 2 |
| Physical properties of coating composition | | | | | | |
| Viscosity (cps) | | | | | | |
| Upon prep. | 560 | 470 | 540 | 460 | 550 | 470 |
| After 24 hrs. | 600 | 510 | 580 | 480 | 570 | 480 |
| pH (upon prep.) | 9.5 | 9.5 | 9.6 | 9.5 | 9.5 | 9.5 |
| Properties of coated paper | | | | | | |
| Coated amount/side (g/m$^2$) | 15.3 | 15.7 | 14.9 | 15.0 | 15.1 | 15.1 |
| Water resistance | | | | | | |
| Wet Pick method | 1.0 | 1.0 | 3.8 | 3.5 | 4.2 | 4.0 |
| Wet Rub method | 1.0 | 1.0 | 3.5 | 3.5 | 4.0 | 3.8 |
| Amount of released formaldehyde (ppm) | 1 | 1 | 8 | 9 | 9 | 9 |
| Ink receptivity | | | | | | |
| Method A | 1.5 | 1.5 | 4.0 | 4.0 | 4.2 | 4.2 |
| Method B | 1.5 | 1.5 | 4.0 | 4.0 | 4.2 | 4.0 |
| Method C | 1.0 | 1.0 | 3.5 | 3.5 | 4.2 | 4.2 |
| Properties of coated paper | | | | | | |
| Whiteness (%) | | | | | | |
| Before heat treatment | 79.8 | 79.0 | 79.1 | 78.8 | 78.5 | 78.7 |
| After heat treatment | 77.5 | 77.0 | 77.1 | 76.9 | 77.4 | 77.2 |
| Blister resistance (°C.) | 180 | 180 | 200 | 200 | 210 | 210 |

While the invention has been described in detail and with reference to specific embodiment thereof, it will be apparent to one skilled in the art that various changes and modifications can be made therein without departing from the spirit and scope thereof.

What is claimed is:

1. A paper coating composition containing a pigment and an aqueous binder as major components, and further containing a mixture of (X) a reaction product between (a) at least one alkylenediamine or polyalkylenepolyamine and (b) epihalohydrin, and (Y) a water-soluble resin obtained by reacting urea, polyalkylenepolyamine, and dibasic carboxylic acid to form a polyamidopolyurea and reacting the resulting polyamidopolyurea with formaldehyde, or containing these reaction products.

2. A composition as in claim 1, wherein said water-soluble resin (Y) is a water-soluble resin obtained by a deammoniation reaction between urea and polyalkylenepolyamine, then a dehydration condensation between the reaction product and dibasic carboxylic acid, and deammoniation reaction between the resulting product and urea, and a reaction of the thus obtained polyamidopolyurea with formaldehyde in an aqueous solution under an acidic condition, or initially under an alkaline condition and then under an acidic condition.

3. A composition as in claim 1, wherein said water-soluble resin (Y) is a water-soluble resin obtained by a dehydration condensation between polyalkylenepolyamine and dibasic carboxylic acid, then a deammoniation reaction between the reaction product and urea, and a reaction of the thus obtained polyamidopolyurea with formaldehyde in an aqueous solution under an acidic condition, or initially under an alkaline condition and then under an acidic condition.

4. A composition as in claim 2, wherein from 1.5 to 2.5 moles of polyalkylenepolyamine per mole of urea is used in the reaction between urea and polyalkylenepolyamine, and subsequently dibasic carboxylic acid is used in an amount of from 0.3 to 0.7 mole per mole of the polyalkylenepolyamine, and subsequently urea is used in an amount of from 0.2 to 1.5 moles per mole of secondary amino group in the polyalkylenepolyamine.

5. A composition as in claim 2, wherein the temperature during the reaction between urea and polyalkylenepolyamine is maintained at from 100° to 200° C., the temperature during the reaction between the resulting product and dibasic carboxylic acid is maintained at from 120° to 250° C., and the temperature during the reaction between the resulting product and urea is maintained at from 100° to 180° C.

6. A composition as in claim 3, wherein from 1.4 to 3.0 moles of polyalkylenepolyamine is used per mole of dibasic carboxylic acid in the reaction between the dibasic carboxylic acid and the polyalkylenepolyamine, and the amount of urea used is from 0.2 to 1.0 mole per mole of the amino group of polyalkylenepolyamine.

7. A composition as in claim 3, wherein the temperature during the reaction between the dibasic carboxylic acid and the polyalkylenepolyamine is maintained at from 120° to 250° C., and the temperature during the reaction between the resulting product and urea is maintained at from 100° to 180° C.

8. A composition as in claim 1, wherein the amount of formaldehyde is from 0.2 to 1 mole per mole of the total amount of urea used for synthesizing the polyamidopolyurea.

9. A composition as in claim 1, wherein the temperature during the reaction between formaldehyde and polyamidopolyurea is maintained at from 40° to 80° C.

10. A composition as in claim 1, wherein the amount of (a) is 0.05 to 5 moles per mole of the dibasic carboxylic acid used for synthesizing (Y).

11. A composition as in claim 1, wherein the molar ratio of (a) to (b) in (X) is 1:0.1 to 20.

12. A composition as in claim 1, wherein the temperature of the reaction between (a) and (b) is 30° to 80° C.

13. A composition as in claim 1, wherein the temperature of the reaction between (X) and (Y) is 20° to 80° C.

14. A composition as in claim 1, wherein the polyalkylenepolyamine is a compound having two primary amino groups and at least one secondary amino group per molecule.

15. A composition as in claim 1, wherein said dibasic carboxylic acid is an aliphatic dibasic carboxylic acid.

16. A composition as in claim 1, wherein the solids content of the aqueous binder is from 3 to 30 wt% based on the weight of pigment.

17. A composition as in claim 1, wherein the solids content of the thermosetting resin obtained from (a), (b), and (Y) is 0.05 to 5 wt%, based on the weight of the pigment.

18. A composition as in claim 1, which contains from 30 to 80 wt% solids.

19. A process for preparing a thermosetting resin in aqueous solution, comprising reacting (X) a reaction product obtained by reacting (a) at least one alkylenediamine or polyalkylenepolyamine and (b) epihalohydrin, with (Y) a water-soluble resin obtained by reacting urea, polyalkylenepolyamine, and dibasic carboxylic acid, and further reacting the resulting polyamidopolyurea with formaldehyde.

20. A coated paper having coated thereon a paper coating composition, said paper coating composition containing a pigment and an aqueous binder as major components, and further containing a mixture of (X) a reaction product between (a) at least one alkylenediamine or polyalkylenepolyamine and (b) epihalohydrin, and (Y) a water-soluble resin obtained by reacting urea, polyalkylenepolyamine, and dibasic carboxylic acid to form a polyamidopolyurea and reacting the resulting polyamidopolyurea with formaldehyde, or containing these reaction products.

* * * * *